United States Patent [19]

Byungnam

[11] Patent Number: 5,607,746

[45] Date of Patent: Mar. 4, 1997

[54] CLOTH FOR WATERPROOF SUITS

[76] Inventor: Hyun Byungnam, 174-125, Jungkok-Dong, Seongdong-ku, Seoul, Rep. of Korea

[21] Appl. No.: 514,527

[22] Filed: Aug. 14, 1995

[51] Int. Cl.$^6$ ........................................................ B32B 3/10
[52] U.S. Cl. ............................................ 428/138; 428/134
[58] Field of Search ...................................... 428/134, 138

[56]  References Cited

U.S. PATENT DOCUMENTS 4,234,637  11/1980  Sewell et al. ............................ 428/131
4,356,569  11/1982  Sullivan ................................... 2/2.5

*Primary Examiner*—Christopher Raimund
*Attorney, Agent, or Firm*—Harrison & Egbert

[57] ABSTRACT

Cloth for waterproof suits comprising a rubber waterproof layer in which circular or rectangular holes are formed at a population of 10 to 500 per ten square centimeters, a moisture-permeable waterproof polyurethane coating layer and two flexible cloth layers, wherein the moisture-permeable waterproof polyurethane layer is made in a wet process and a dry process and the opposite surfaces of the rubber waterproof layer each bind to the polyurethane layer and one of the flexible cloth layers through adhesive layers, the other flexible cloth layer being formed on the polyurethane layer. The adhesive layers may contain ceramic powder capable of emitting far infrared rays. The adhesive layers containing such ceramic powders, when elevating temperature or illuminating light, emits infrared rays, which are easily absorbed in organic materials, showing various profitable effects including deodorization as well as warmth-keeping, sterilization and anti-putrefaction. A waterproof suit made of the cloth has various profitable influences on the skin and prevents the bad odor attributable to sweat or moisture. After using, the waterproof suit can, even though remaining undried, prevent the propagation of fungi and bad odor. Therefore, it is very sanitary.

2 Claims, 2 Drawing Sheets

CLOTH FOR WATERPROOF SUITS

BACKGROUND OF THE INVENTION

1. Field of the Invention

The present invention relates, in general, to cloth for waterproof suits with the purpose of waterproofing and keeping workers who work in water, swamp or so on, warm, and more particularly, to moisture-permeable waterproof cloth with various profitable functions including antibacterial character, deodorization and health promotion.

2. Description of the Prior Art

Generally, a waterproof suit has dual functions: thermal insulation and waterproofing. Waterproof suits are useful for a plurality of purposes, including diving suits for scuba divers in water, valley fishing suits for fishermen who stand in water up to their waist, working clothes for swampy places such as rice paddy fields, ponds and the like, and skiing suits. Most waterproof suits are made of rubber.

Rubber waterproof suits, however, are very disadvantageous in many aspects because they completely insulate the human body from not only outer water but also the air. For example, if a man wears a rubber waterproof suit for a long time, perspiration and moisture are generated and cannot transpire from the suit, causing dermal diseases to the body, such as heat rash and eczema. In addition, if the rubber waterproof suit remains undried after using, it creates a habitat where microorganisms such as fungi propagate by virtue of the perspiration and moisture, emitting an offensive odor. Consequently, rubber waterproof suits are bad for the health.

SUMMARY OF THE INVENTION

Accordingly, it is a principal object of the present invention to provide cloth for waterproof suits, which can permeate moisture but not water, thereby transpiring the moisture generated from the human body.

It is another object of the present invention to provide cloth for waterproof suits with deodorizing and antibacterial properties.

It is a further object of the present invention to provide a sanitary waterproof suit.

In accordance with an aspect of the present invention, there is provided cloth for waterproof suits, comprising a rubber waterproof layer in which circular or rectangular holes with a maximum diameter of 0.1 to 10 mm are formed at a population of 10 to 500 per ten square centimeter, a moisture-permeable waterproof polyurethane coating layer with a thickness of 1 to 100 μm and two flexible cloth layers, wherein said moisture-permeable waterproof polyurethane layer is made in a wet process and a dry process and the opposite surfaces of said rubber waterproof layer each bind to said polyurethane layer and one of said flexible cloth layers through adhesive layers, the other flexible cloth layer being formed on said polyurethane layer.

In accordance with another aspect of the present invention, there is provided cloth for waterproof suits, comprising a rubber waterproof layer having holes, a moisture-permeable waterproof polyurethane coating layer, and two flexible cloth layers, wherein said moisture-permeable waterproof polyurethane layer is made in a wet process and a dry process and the opposite surfaces of said rubber waterproof layer each bind to said polyurethane layer and one of said flexible cloth layers through adhesive layers comprising ceramic powders, the other flexible cloth layer being formed on said polyurethane layer.

BRIEF DESCRIPTION OF THE DRAWINGS

The above objects and other features and advantages of the present invention will be more apparent from the following detailed description taken with reference to the accompanying drawings, in which.

DETAILED DESCRIPTION OF THE INVENTION

Turning now to a detailed description of the invention, it will be best understood with reference to the accompanying drawings.

Figure 1:
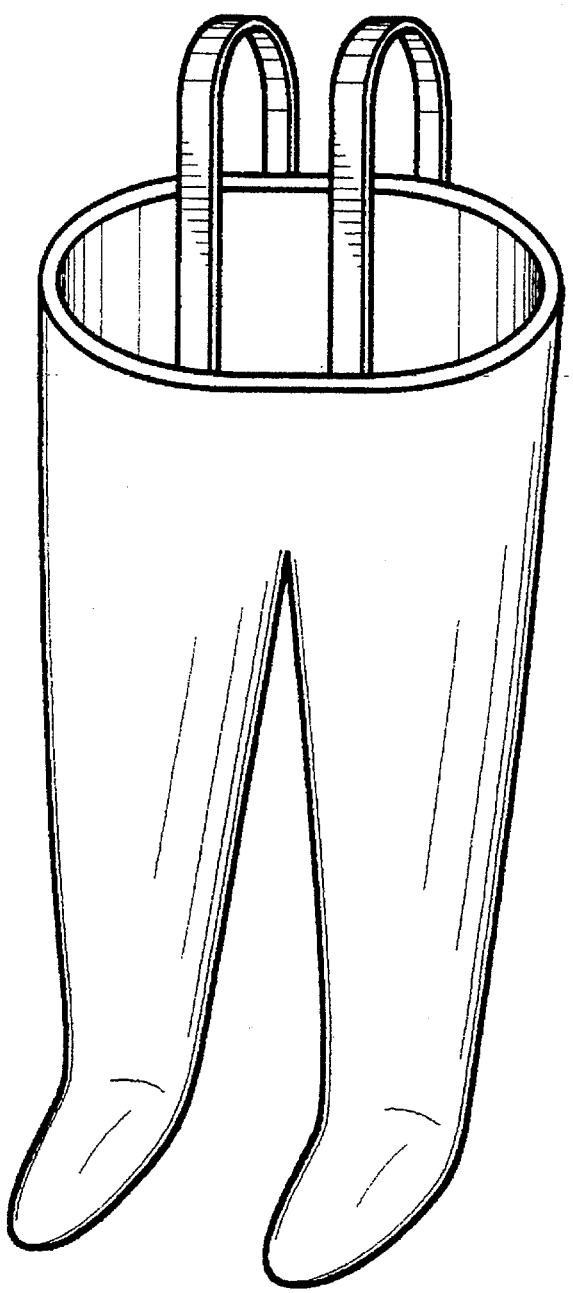
FIG. 1 is a schematic diagram showing a conventional rubber waterproof suit for valley fishing.
Figure 2A:
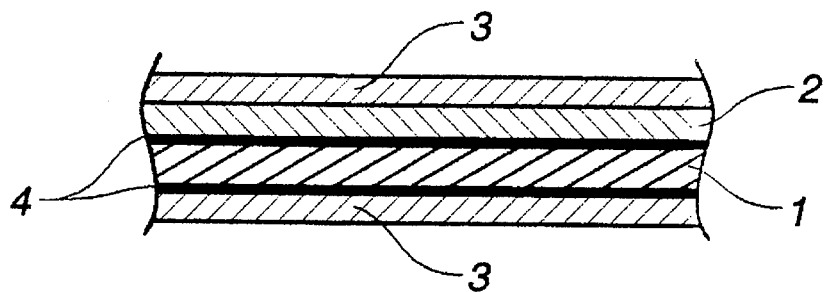
FIG. 2A is a schematic cross sectional view showing cloth for waterproof suit in accordance with one embodiment of the present invention.

Referring initially to FIG. 2A, there is shown cloth for a waterproof suit, in accordance with one embodiment of the present invention. As shown in FIG. 2A, the cloth has a multilayer structure comprising a rubber waterproof layer 1, in which holes are formed as will be described later, a polyurethane coating layer 2 and two flexible cloth layers 3, wherein the polyurethane coating layer 2 and one of the flexible cloth layers 3 are attached to each of the opposite surfaces of the rubber waterproof layer 1 through an adhesive layer 4, the other flexible cloth layer 3 being formed on the polyurethane coating layer 2. In this embodiment, the flexible cloth layer 3 directly attached to the rubber waterproof layer 1 comes in contact with the human skin.

Figure 2B:
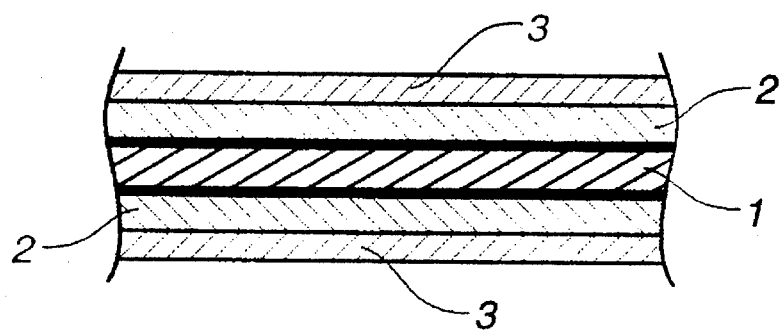
FIG. 2B is a schematic cross sectional view showing cloth for waterproof suit in accordance with another embodiment of the present invention.
Figure 2C:
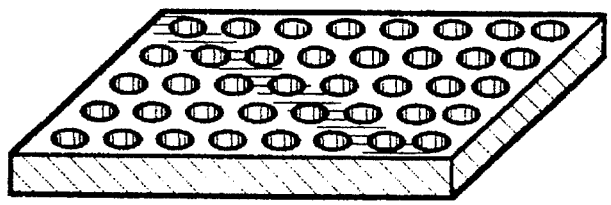
FIG. 2C is a schematic diagram showing an example of a rubber waterproof layer having a population of holes in accordance with the present invention.

With reference to FIG. 2C, there is shown an example of the rubber waterproof layer 3 having holes, in accordance with the present invention. There is no limit to the shape of the holes. But, preference is given to circular or rectangular shapes for the convenience of working. In case of circular shapes, the maximum diameter is selected from a range of 0.1 to 10 mm. Other shapes may also be formed on the basis of this size range. It is preferred that the population of the holes is on the order of 10 to 500 per ten square centimeters.

In accordance with the present invention, the polyurethane coating layer 3 is moisture-permeable and waterproof and has a thickness of about 1 to about 100 microns, which can be made by either a wet process or dry process. Polyurethane is a polymer having repeating units of —NH-COO— moiety which are synthesized through the polyaddition reaction of diisocyanate and glycol. In the wet process, a polyurethane resinous solution in dimethylformamine (DMF), a water-compatible solvent is coated on flexible cloth made of natural fibers or synthetic fibers and then, the coated flexible cloth is immersed in water. Water dissolves out the water-soluble DMF and makes the polyurethane coating be cured. As a result, the polyurethane coating contains innumerable microscopic pores which are formed with the removal of DMF and through which moisture can permeate but water molecules cannot.

On the other hand, a moisture-permeable waterproof polyurethane coating prepared by the dry process comprises hydrophilic materials, such as silica gel, which absorb moisture and transpire it outward.

Such moisture-permeable waterproof polyurethane cloth is commercially available, for example, from Toray Co. Ltd., Japan, under the trademark "Entrant" or from Kolon Co. Ltd., Korea, under the trademark "HEALSPO".

Meanwhile, the cloth used in the present invention is required to be of high flexibility because the rubber waterproof layer 1 is exceptionally flexible.

In accordance with the present invention, the cloth for a waterproof suit can have deodorizing and antibacterial functions. In addition to binding the moisture-permeable waterproof polyurethane coating 2 and the flexible cloth layer 3 to the rubber waterproof layer 1, the adhesive layer 4 is responsible for the deodorizing and antibacterial functions. This can be achieved by adding ceramic powders, a far infrared ray-emitting material, in an adhesive composition. In this regard, the ceramic powders are contained preferably at an amount of about 0.1 to about 10% by weight based on the total weight of the adhesive composition. For example, if too little ceramic powder is used, it cannot emit far infrared rays at the amount sufficient to exhibit efficacy. On the other hand, if too much ceramic powder is used, many problems arise, including particle dispersion and a cost increase.

Examples of the adhesive available in the present invention include rubber adhesives such as rubber chloride, vinyl adhesives, and thermoplastic adhesives such as non-crosslinked polyamide, polyester and polyurethane.

As for ceramic powders, a composition consisting mainly of $SiO_2$, $Al_2O_3$, $ZrO_2$ and $B_2O_3$ is immersed in water and sequentially subjected to oxidation, curing and drying and then, sintered at 1,200° C. or higher and pulverized. Preferred ceramic powders are those which have a far infrared ray emission rate of at least 80% at 40° C. and an emission intensity of 0.001 to 0.18 W/cm²μm in the far infrared range.

The adhesive layer containing such ceramic powders, when elevating temperature or illuminating light, emits infrared rays, which are easily absorbed in organic materials, showing various profitable effects including deodorization as well as warmth-keeping, sterilization and anti-putrefaction. For human body, the far infrared rays can penetrate into 40 mm below the skin, causing vibration of atoms or molecules in the human body. In turn, the atomic or molecular vibration gives rise to thermal reactions which elevate the temperature of the hypodermal tissue, accompanied by profitable effects such as telangiectasia, promotion of blood irculation and enhancement of metabolism. In addition, the human body receives secondary benefits such as warmth-keeping, aging and fatigue-recovering, by virtue of the profitable effects.

With reference to FIG. 2B, there is shown cloth for a waterproof suit in accordance with another embodiment of the present invention. As shown in this figure, the cloth has a multilayer structure comprising a rubber waterproof layer 1 which has holes as described above, two polyurethane coating layers 2 and two flexible cloth layers 3, wherein each of the polyurethane coating layers 2 is attached to each of the opposite surfaces of the rubber waterproof layer 1 through an adhesive layer 4. The flexible cloth layers 3 each are formed on the polyurethane coating layers 2.

Consequently, a waterproof suit made of the cloth comprising the flexible rubber waterproof layer, the moisture-permeable waterproof polyurethane layer and the far infrared ray emitting-layer according to the present invention has various profitable influences on the skin and prevents the bad odor attributable to sweat or moisture. After using, the waterproof suit of the present invention can, even though remaining undried, prevent the propagation of fungi and bad odor. Therefore, it is very sanitary.

A better understanding of the present ceramic heater may be obtained in light of the following examples which are set forth to illustrate, and are not to be construed to limit, the present invention.

EXAMPLE I

Cloth for a waterproof suit was prepared by binding a flexible nylon cloth with a polyurethane coating made by a wet process, commercially available from Kolon, Korea, under the trademark "HEALSPO 10000", to one surface of a rubber waterproof layer in which circular holes with a diameter of 2 mm were formed at a population of 36 per ten square centimeter, through a rubber chloride adhesive in such a way that the polyurethane coating might face toward the rubber waterproof layer. The cloth was much improved in moisture ventilation.

EXAMPLE II

Cloth for a waterproof suit was prepared in a similar manner to that of Example I, except that the adhesive comprised ceramic powder at an amount of 3% by weight. The prepared cloth had sanitary functions such as deodorization and antibacterial character in addition to being improved in moisture ventilation.

Waterproof suits made of cloth of Examples I and II and a conventional rubber waterproof suit were tested for propagation of fungi. The results are given as shown in Table I below.

TABLE I

| | Degree of Fungi Propagation | | | | | |
|---|---|---|---|---|---|---|
| | Time (day, at 30° C. and 80% RH) | | | | | |
| Waterproof Suit | 1 | 2 | 4 | 6 | 8 | 10 |
| Rubber Article | 1 | 2 | 4 | 5 | — | — |
| Example I | 0 | 1 | 3 | 4 | 5 | — |
| Example II | 0 | 0 | 0 | 1 | 1 | 2 |

Note:
0: no fungus;
1: generation of fungi;
2: spread of fungi over one tenth of sample
3: spread of fungi over one sixth of sample
4: spread of fungi over one third of sample
5: spread of fungi all over the sample Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. Cloth for waterproof suits, comprising a rubber waterproof layer in which circular or rectangular holes with a maximum diameter of 0.1 to 10 mm are formed at a population of 10 to 500 per ten square centimeters, said rubber waterproof layer having a first surface on one side and a second surface on an opposite side, a moisture-permeable waterproof polyurethane coating layer with a thickness of 1 to 100 μm and two flexible cloth layers, wherein said moisture-permeable waterproof polyurethane coating layer is made in a wet process or a dry process, one of the surfaces of said rubber waterproof layer is bonded to said polyurethane coating layer with an adhesive material and the other surface of the rubber waterproof layer is bonded to one of said flexible cloth layers with said adhesive material, the other flexible cloth layer being formed on said polyurethane coating layer.

2. The cloth for waterproof suits in accordance with claim 1, wherein said adhesive material is made of rubber or a thermoplastic composition containing ceramic powder at an amount of 0.1 to 10% by weight based on the total weight of the composition, said ceramic powders having a far infrared ray-emitting rate of at least 80% at 40° C. and an emitting intensity of 0.01 to 18 $W/cp^2\mu m$ at the far infrared range.

\* \* \* \* \*